(12) United States Patent
Sun

(10) Patent No.: US 11,370,268 B2
(45) Date of Patent: Jun. 28, 2022

(54) AIR CONDITIONER ENERGY-SAVING INFLATABLE DEVICE AND VEHICLE

(71) Applicant: GIGA-BYTE TECHNOLOGY CO., LTD., New Taipei (TW)

(72) Inventor: Pei-Hua Sun, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 415 days.

(21) Appl. No.: 16/744,132

(22) Filed: Jan. 15, 2020

(65) Prior Publication Data

US 2020/0317025 A1 Oct. 8, 2020

(30) Foreign Application Priority Data

Apr. 2, 2019 (TW) .................................. 108111592

(51) Int. Cl.
*B60H 1/00* (2006.01)
*B60H 1/24* (2006.01)

(52) U.S. Cl.
CPC ..... *B60H 1/00742* (2013.01); *B60H 1/00295* (2019.05); *B60H 1/00499* (2019.05); *B60H 1/00578* (2013.01); *B60H 1/248* (2013.01)

(58) Field of Classification Search
CPC ............ B60H 1/00742; B60H 1/00295; B60H 1/00499; B60H 1/00578; B60H 1/248; B60H 1/00592; B60H 1/00207; B60H 2001/00242; Y02T 10/88
See application file for complete search history.

(56) References Cited

U.S. PATENT DOCUMENTS

2013/0001928 A1 * 1/2013 Panaro .................... B60R 11/00
280/727

FOREIGN PATENT DOCUMENTS

| CN | 101242970 | | 8/2008 |
|----|-----------|---|--------|
| CN | 103656815 | | 3/2014 |
| DE | 102008014442 | | 9/2009 |
| DE | 102014101380 | | 8/2015 |
| DE | 102014101380 | A1 * | 8/2015 |
| EP | 0533605 | | 3/1993 |
| WO | 2008111091 | | 9/2008 |

OTHER PUBLICATIONS

"Office Action of Taiwan Counterpart Application," dated Aug. 23, 2019, p. 1-p. 3.
"Search Report of Europe Counterpart Application", dated Aug. 18, 2020, p. 1-p. 6.

* cited by examiner

*Primary Examiner* — Emmanuel E Duke
(74) *Attorney, Agent, or Firm* — JCIPRNET

(57) ABSTRACT

An air conditioner energy-saving inflatable device is adapted to be disposed in a vehicle body. The air conditioner energy-saving inflatable device includes an air pump, an air bag, a circuit board and a sensor. The air bag is connected to the air pump and adapted to be disposed beside an area in the vehicle body. The circuit board is electrically connected to the air pump and includes a controller. When an air-conditioning system of the vehicle body is activated, the sensor is adapted to sense whether the area is vacant. When the sensor senses that the area is vacant, the controller instructs the air pump to inflate the air bag, so that the air bag fills at least a portion of the area. When the air-conditioning system of the vehicle body stops running, the air bag is deflated. A vehicle is also provided.

10 Claims, 4 Drawing Sheets

AIR CONDITIONER ENERGY-SAVING INFLATABLE DEVICE AND VEHICLE

CROSS-REFERENCE TO RELATED APPLICATION

This application claims the priority benefit of Taiwan application serial no. 108111592, filed on Apr. 2, 2019. The entirety of the above-mentioned patent application is hereby incorporated by reference herein and made a part of this specification.

BACKGROUND

Field of the Disclosure

The present disclosure relates to an air conditioner energy-saving device, and more particularly to an air conditioner energy-saving inflatable device.

Description of Related Art

In general, almost every vehicle made nowadays is equipped with an air-conditioning system, and the air-conditioning system usually works as an air conditioner and a heater, respectively. However, in most cases, when the vehicle is on the road, there might not be passengers on the rear seat and the passenger seat. Therefore, in the case of medium and large vehicles, if the air-conditioning system of the vehicle must keep the space inside the vehicle at a specific temperature, a lot of power will be consumed, resulting in consumption of a considerable amount of fuel. In addition, in the case of an electric vehicle, the electric energy consumed by the in-vehicle air-conditioning system will have a greater impact on the overall energy consumption of the electric vehicle.

SUMMARY OF THE DISCLOSURE

The disclosure provides an air conditioner energy-saving inflatable device capable of filling a part of the vehicle body to save air-conditioning energy consumption.

The present disclosure provides a vehicle having the above-mentioned air conditioner energy-saving inflatable device.

The air conditioner energy-saving inflatable device of the disclosure is adapted to be arranged in a vehicle body. The air conditioner energy-saving inflatable device includes an air pump, an air bag, a circuit board and a sensor. The air bag communicates with the air pump and is adapted to be disposed beside an area of the vehicle body. The circuit board is electrically connected to the air pump and includes a controller. The sensor is electrically connected to the circuit board and is adapted to be disposed in an area of the vehicle body. When the air-conditioning system of the vehicle body is activated, the sensor is adapted to sense whether the area of the vehicle body is vacant. When the sensor senses that the area of the vehicle body is vacant, the controller instructs the air pump to inflate the air bag and fill at least a part of the area. When the air-conditioning system of the vehicle body stops running, the air bag is deflated.

In an embodiment of the disclosure, a pipeline is further disposed between the air pump and the air bag to communicate the air pump with the air bag, wherein the air bag has an air vent, and the edge of the air bag close to the air vent is fixed to an inner wall of the pipeline. When the air-conditioning system of the vehicle body stops running, the air pump sucks air from the air bag to deflate the air bag, and the air bag that is deflated is sucked into the pipeline by the air pump.

In an embodiment of the disclosure, a mesh sheet is further disposed at a portion in the pipeline near the air bag to stop the air bag sucked into the pipeline by the air pump.

In an embodiment of the disclosure, the device further includes a bag collecting module, the bag collecting module includes a reel, a driver and a wire. The driver is electrically connected to the circuit board and drives the reel to rotate. The wire has a first end and a second end opposite to each other, wherein the first end of the wire is connected to the air bag, the second end of the wire is connected to the reel, and the wire is retractably wound around the reel. The controller is adapted to instruct the driver to drive the reel to rotate to release the wire from the reel or wind the wire around the reel to release or collect the air bag.

In an embodiment of the disclosure, the sensor includes an infrared sensor, a Doppler radar, a millimeter wave radar, or a combination thereof.

The vehicle of the present disclosure includes a vehicle body and an air conditioner energy-saving inflatable device. The air conditioner energy-saving inflatable device includes an air pump, an air bag, a circuit board and a sensor. The air bag communicates with the air pump and is adapted to be disposed beside an area of the vehicle body. The circuit board is electrically connected to the air pump and includes a controller. The sensor is electrically connected to the circuit board and is adapted to be disposed in an area of the vehicle body. When the air-conditioning system of the vehicle body is activated, the sensor is adapted to sense whether the area of the vehicle body is vacant. When the sensor senses that the area of the vehicle body is vacant, the controller instructs the air pump to inflate the air bag and fill at least a part of the area. When the air-conditioning system of the vehicle body stops running, the air bag is deflated.

In an embodiment of the disclosure, a pipeline is further disposed between the air pump and the air bag to communicate the air pump with the air bag, wherein the air bag has an air vent, and the edge of the air bag close to the air vent is fixed to an inner wall of the pipeline. When the air-conditioning system of the vehicle body stops running, the air pump sucks air from the air bag to deflate the air bag, and the air bag that is deflated is sucked into the pipeline by the air pump.

In an embodiment of the disclosure, a mesh sheet is further disposed in a portion of the pipeline near the air bag to stop the air bag sucked into the pipeline by the air pump.

In an embodiment of the disclosure, the device further includes a bag collecting module, the bag collecting module includes a reel, a driver and a wire. The driver is electrically connected to the circuit board and drives the reel to rotate. The wire has a first end and a second end opposite to each other, wherein the first end of the wire is connected to the air bag, the second end of the wire is connected to the reel, and the wire is retractably wound on the reel, wherein the controller is adapted to instruct the driver to drive the reel to rotate to release the wire from the reel or wind the wire around the reel to release or collect the air bag.

In an embodiment of the disclosure, the sensor includes an infrared sensor, a Doppler radar, a millimeter wave radar, or a combination thereof.

Based on the above, the air conditioner energy-saving inflatable device of the present disclosure has an air bag communicated with the air pump, and has a controller electrically connected to the sensor and the air pump. When the air-conditioning system in the vehicle is activated, if the sensor senses that there is vacancy in the vehicle body, the controller can instruct the air pump to inflate the air bag, so that the air bag is expanded and occupies a partial space of the vacancy, such that the space for air-conditioning circulation in the vehicle is reduced, thereby saving air-conditioning energy consumption. In addition, when the air-conditioning system in the vehicle is in a non-operating state, the air bag is deflated and restored to the state where the space is not occupied.

In order to make the aforementioned features and advantages of the disclosure more comprehensible, embodiments accompanying figures are described in detail below.

DESCRIPTION OF EMBODIMENTS

Figure 1:
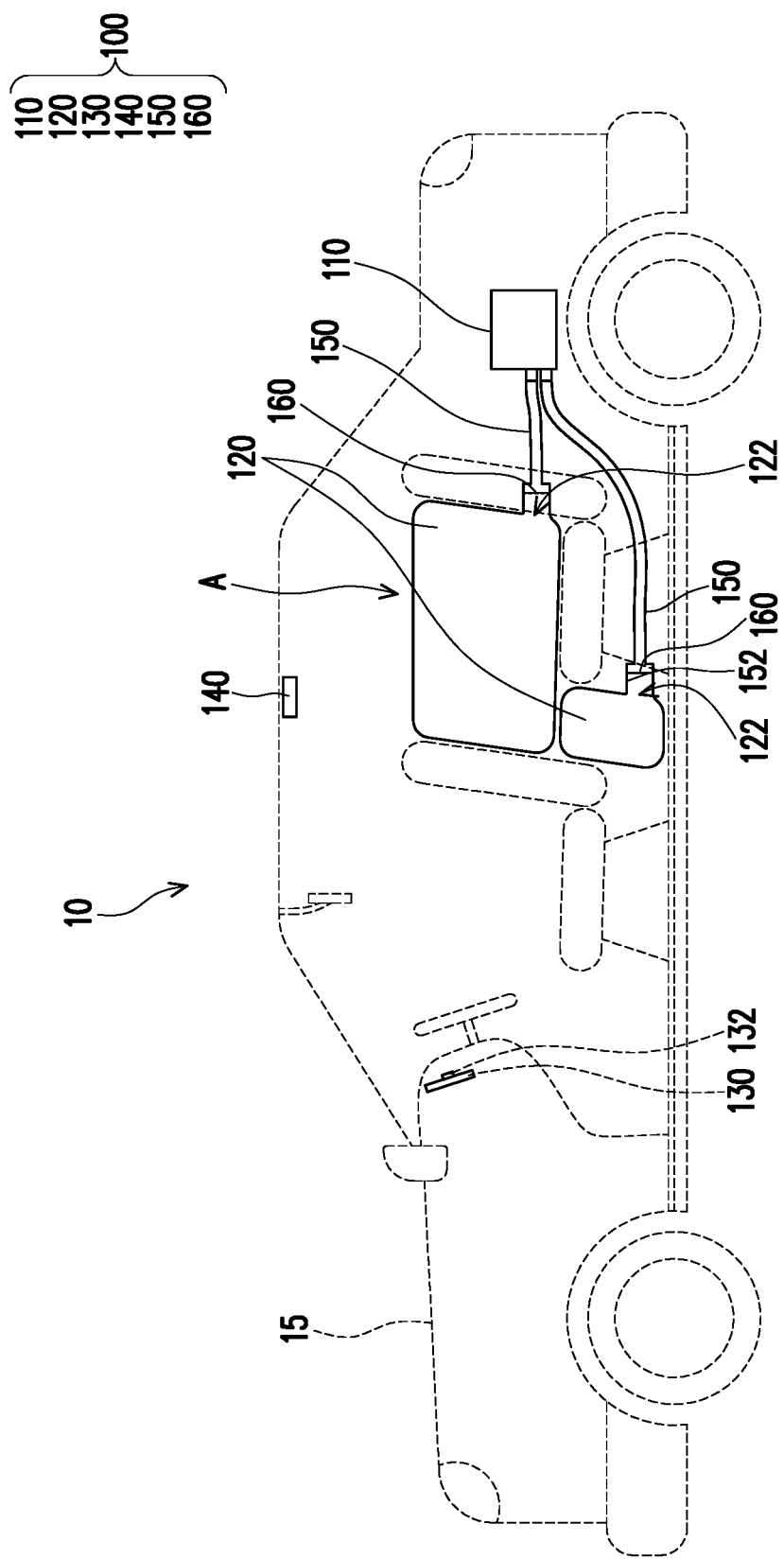
FIG. 1 is a schematic perspective view of a vehicle according to an embodiment of the present disclosure.

FIG. 1 is a schematic perspective view of a vehicle according to an embodiment of the present disclosure. Referring to FIG. 1, in the embodiment, the vehicle 10 includes an air conditioner energy-saving inflatable device 100 and a vehicle body 15. The air conditioner energy-saving inflatable device 100 is adapted to be disposed in the vehicle body 15. The air conditioner energy-saving inflatable device 100 includes an air pump 110, an air bag 120, a circuit board 130, and a sensor 140. The vehicle body 15 has an area A therein. The air bag 120 of the air conditioner energy-saving inflatable device 100 is disposed beside the area A in the vehicle body 15. The area A is, for example, a passenger seat or a rear seat in the vehicle body 15, which should not be construed as a limitation to the disclosure.

In the present embodiment, the air conditioner energy-saving inflatable device 100 is applied to the vehicle 10 as an example, and can coordinate with the air-conditioning system of the vehicle body 15. Certainly, in other embodiments, the air conditioner energy-saving inflatable device 100 can also be applied to any device or field that can save energy consumption of the air-conditioning system by filling part of the space, and the disclosure provides no limitation thereto.

It should be noted that, in order to clearly describe the structure and operation mode of the air conditioner energy-saving inflatable device 100 and 100a of the present disclosure, the following drawings (FIG. 2-FIG. 6) only illustrate the structure of the air conditioner energy-saving inflatable device 100 and 100a and omit the configuration relationship of the detailed structures of the air conditioner energy-saving inflatable device 100 and 100a and the vehicle body 15.

Figure 2:
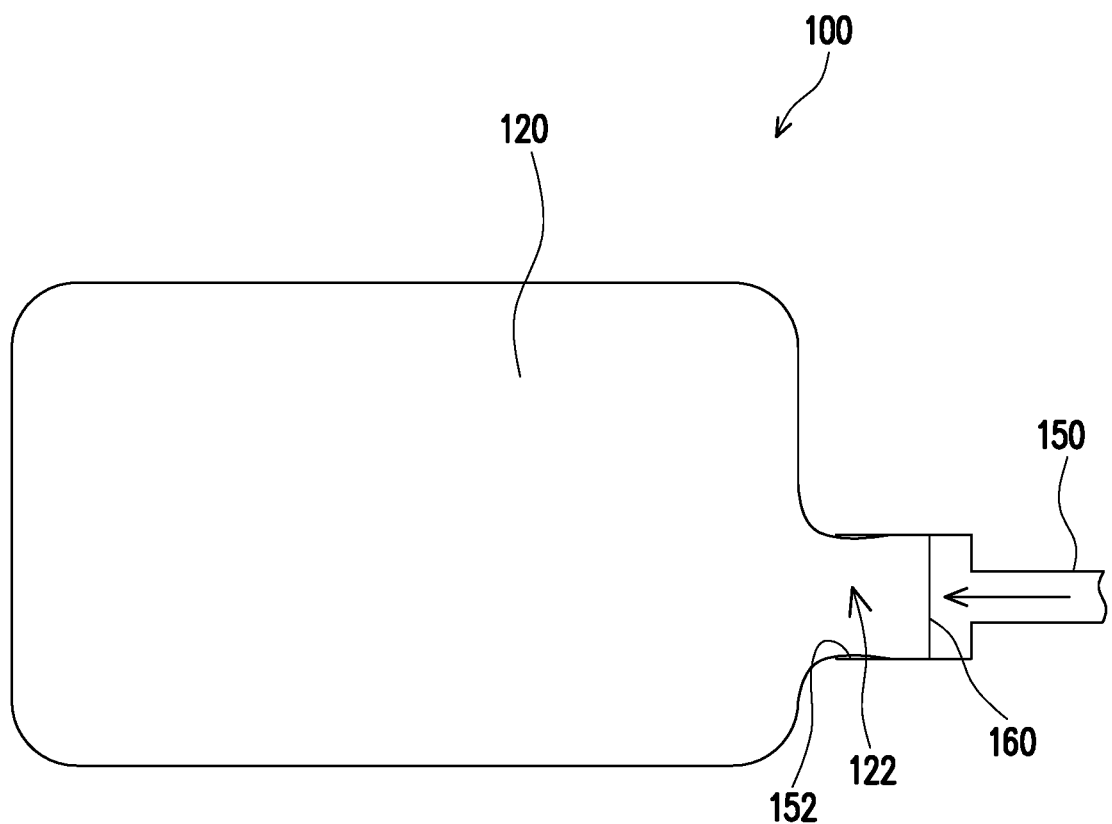
FIG. 2 is a schematic view showing the completion of inflation of an air conditioner energy-saving inflatable device of the vehicle of FIG. 1.
Figure 3:
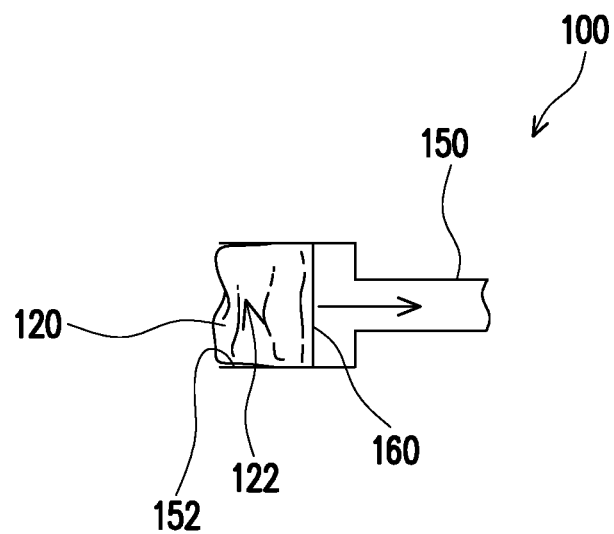
FIG. 3 is a schematic view of the air conditioner energy-saving inflatable device of FIG. 2 in a folded state.

FIG. 2 is a schematic view showing the completion of inflation of an air conditioner energy-saving inflatable device of the vehicle of FIG. 1. FIG. 3 is a schematic view of the air conditioner energy-saving inflatable device of FIG. 2 in a folded state. Referring to FIG. 2 and FIG. 3, in the embodiment, the air bag 120 of the air conditioner energy-saving inflatable device 100 can be disposed in the passenger seat or the rear seat in the vehicle body 15. Specifically, the air bag 120 for filling the passenger seat may be disposed under the chair (not shown) of the passenger seat, and the air bag 120 of the rear seat may be disposed under the chair of the rear seat and inside the back of the rear seat (FIG. 1). Certainly, in other embodiments, the air bag 120 can have other suitable designs to adapt to the needs of various vehicle models, and the air bag 120 can also be arranged at other positions in the vehicle body 15, and the present disclosure provides no limitation to the position and form of the air bag 120.

In the present embodiment, as shown in FIG. 1 to FIG. 3, the air pump 110 communicates with the air bag 120 through the pipeline 150, and the air bag 120 is fixed on the pipeline 150. In detail, in the present embodiment, the air bag 120 has an air vent 122, and the edge of the air bag 120 close to the air vent 122 is fixed to an inner wall 152 of the pipeline 150.

In the present embodiment, the air pump 110 is disposed, for example, in the trunk of the vehicle body 15, and the air pump 110 has a function of inflating and deflating the air bag 120. Of course, in other embodiments, the air pump 110 can also be placed under the chair of the front seat or the rear seat. The positions of the pipeline 150 and the air pump 110 can have other suitable designs to adapt to the needs of various vehicle models. The present disclosure provides no limitation to the configuration of the pipeline 150 in the vehicle body 15 and the position of the air pump 110.

Further, in this embodiment, a controller 132 of the circuit board 130 is electrically connected to the air pump 110 and the sensor 140, and the sensor 140 is disposed in the area A in the vehicle body 15. For example, the area A of the embodiment refers to the space of the rear seat, and therefore the sensor 140 can be disposed above the rear seat, and is configured to detect whether the area A of the rear seat is vacant. Certainly, in other embodiments, the sensor may also be disposed at other positions, and the area does not necessarily refer to the rear seat in the vehicle body, and the present disclosure provides no limitation thereto.

In this embodiment, the sensor 140 is, for example, an infrared sensor, a Doppler radar, or a millimeter wave radar. Certainly, in other embodiments, other types of sensors may be utilized as long as they can sense whether there are passengers in the area or whether the area is vacant, the disclosure provides no limitation thereto.

In this embodiment, when the air-conditioning system of the vehicle body 15 is activated, if the sensor 140 senses that the area A in the vehicle body 15 is vacant, the message is transmitted to the controller 132 in a wireless or wired manner. The controller 132 instructs the air pump 110 to inflate the air bag 120 according to the detection result (the determining signal indicating the area is vacant) until the air bag 120 reaches the full state as shown in FIG. 2 to fill in at least a part of the area A in the vehicle body 15.

It should be noted that if the area A filled by the air bag 120 is, for example, a rear seat, the size and shape of the air bag 120 after inflation can match the shape of the rear seat, and when the air bag 120 reaches the inflated state shown in FIG. 2, the air bag 120 does not block the driver's view in viewing the condition of the rear seat from the rear view mirror. If the area A filled by the air bag 120 is, for example, a passenger seat, the size and shape of the air bag 120 can match the shape of the passenger seat, and likewise, when the air bag 120 reaches the inflated state shown in FIG. 2, the air bag 120 does not block the driver's view in viewing the rear view mirror on the side of the passenger seat, thereby avoiding that the inflated air bag 120 affects the driving safety. Certainly, the present disclosure provides no limitation to the shape of the air bag 120.

In addition, in the embodiment, the air pump 110 is selected from the air pump 110 having an inflation function and a deflation function. That is to say, the air pump 110 can inflate or suck air selectively at this time point, but the air pump 110 is not limited thereto. Further, in the embodiment, when the air-conditioning system stops operating, the controller 132 instructs the air pump 110 to stop inflating the air bag 120, and instructs the air pump 110 to suck air from the air bag 120 to deflate the air bag 120, and the deflated air bag 120 is sucked into the pipeline 150 to reach the folded state as shown in FIG. 3.

In this embodiment, the air conditioner energy-saving inflatable device 100 can also optionally have a mesh sheet 160 disposed in the pipeline 150. The mesh sheet 160 is disposed at a portion of the pipeline 150 close to the air bag 120. Based on this design, when the deflated air bag 120 is sucked into the pipeline 150, the mesh sheet 160 blocks the air bag 120 to reduce the possibility that the air bag 120 is sucked into the inner portion of the pipeline 150 to cause the air bag 120 to be broken or cause damage to the air pump 110.

It is to be noted that the following embodiments adopt the same reference numerals and parts of the foregoing embodiments, wherein the same reference numerals are used to refer to the same or similar elements, and the description of the same technical content is omitted. For the description of the omitted part, reference may be derived from the foregoing embodiment, and similar description will not be repeated in the following embodiments.

Figure 4:
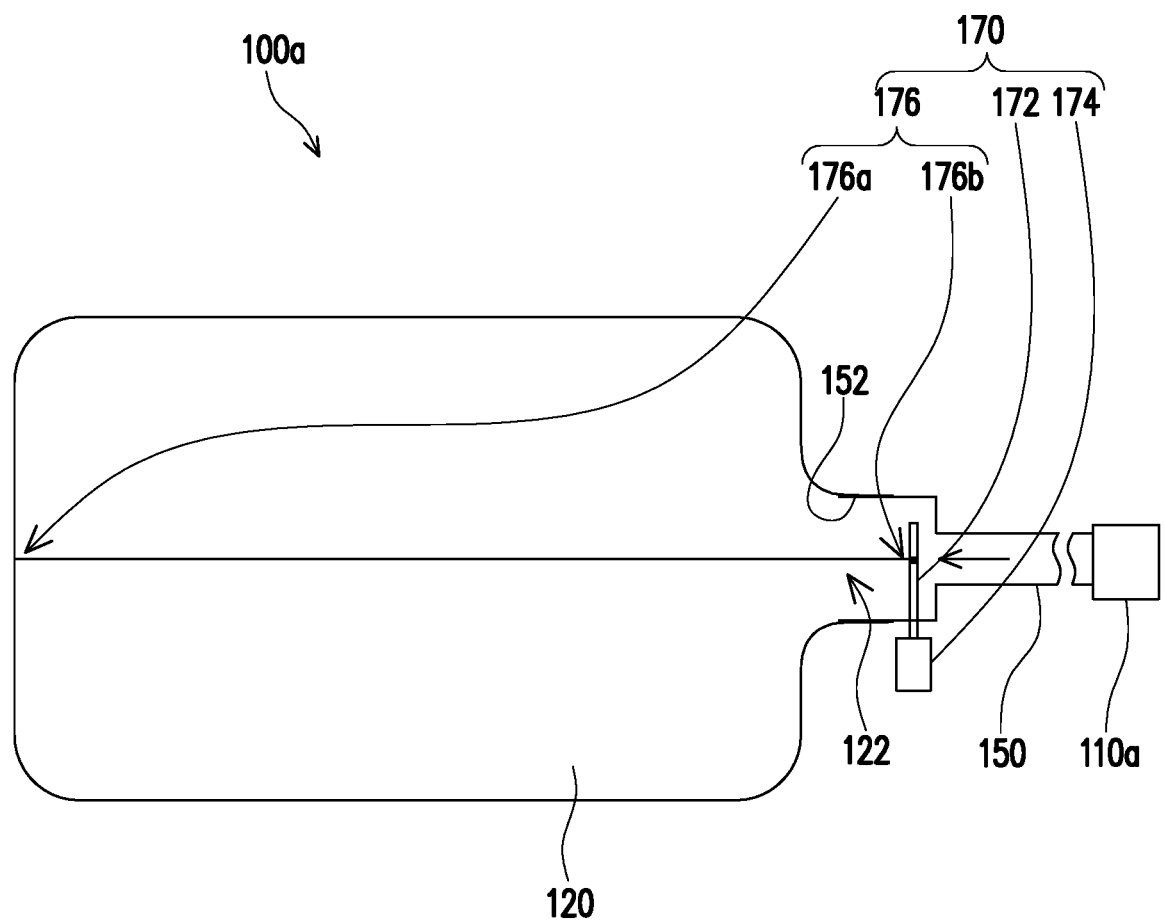
FIG. 4 is a schematic view showing the completion of inflation of an air conditioner energy-saving inflatable device according to another embodiment of the present disclosure.
Figure 5:
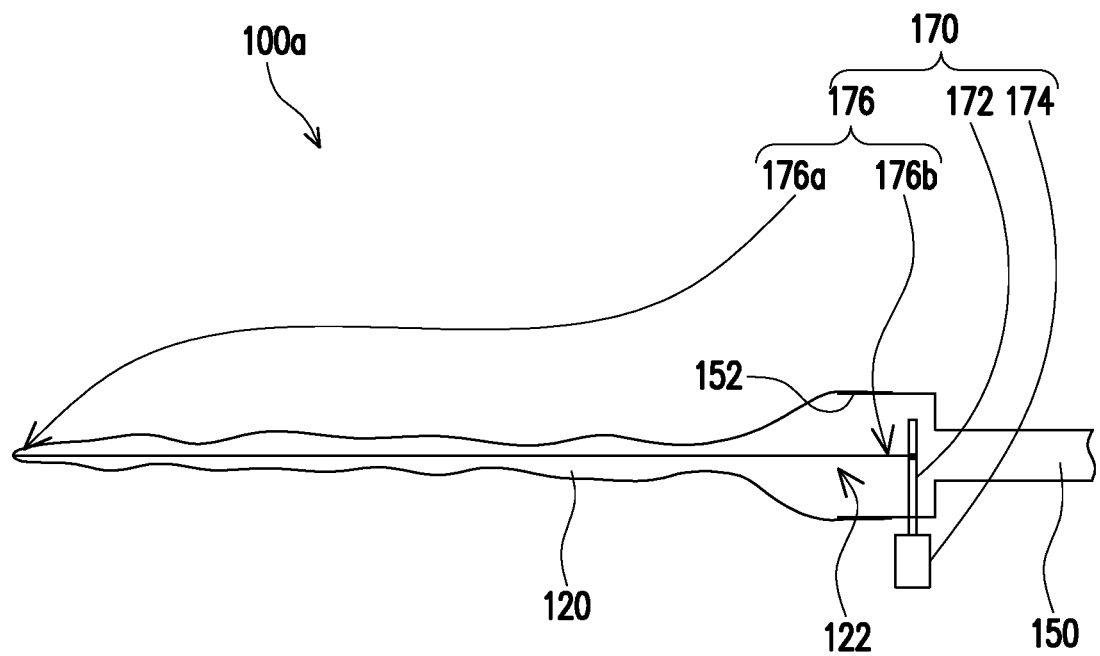
FIG. 5 is a schematic view showing the deflation state of the air conditioner energy-saving inflatable device of FIG. 4.
Figure 6:
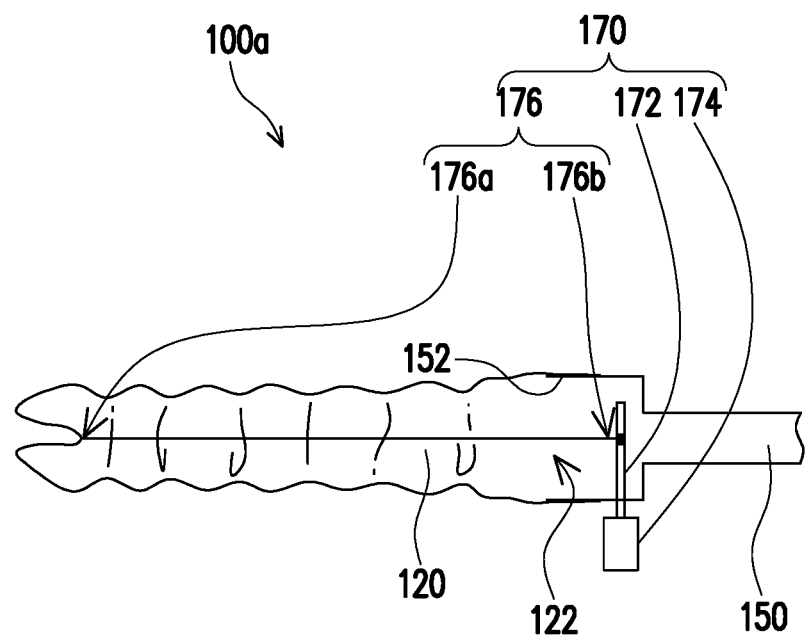
FIG. 6 is a schematic view of the collecting process of the air conditioner energy-saving inflatable device of FIG. 4.

FIG. 4 is a schematic view showing the completion of inflation of an air conditioner energy-saving inflatable device according to another embodiment of the present disclosure. FIG. 5 is a schematic view showing the deflation state of the air conditioner energy-saving inflatable device of FIG. 4. FIG. 6 is a schematic view of the collecting process of the air conditioner energy-saving inflatable device of FIG. 4. Referring to FIG. 4 to FIG. 6, in the embodiment, the air pump 110a of the air conditioner energy-saving inflatable device 100a is, for example, an air pump that can inflate the air bag 120 but does not suck air from the air bag 120, and the air conditioner energy-saving inflatable device 100a further includes a bag collecting module 170. The air bag 120 is, for example, sleeved and fixed outside the pipeline 150, but is not limited thereto.

In detail, in the present embodiment, the bag collecting module 170 includes a reel 172, a driver 174, and a wire 176. The driver 174 is electrically connected to the controller 132 (FIG. 1) of the circuit board 130, and the driver 174 is configured to drive the reel 172 to rotate. The driver 174 is, for example, a motor, but is not limited thereto. The wire 176 has a first end 176a and a second end 176b. The first end 176a of the wire 176 is connected to the air bag 120, the second end 176b is connected to the reel 172, and the wire 176 is retractably would around the reel 172.

In the present embodiment, when the air-conditioning system of the vehicle body 15 is activated, if the sensor 140 senses that the area A in the vehicle body 15 is vacant, in the present embodiment, the controller 132 not only instructs the air pump 110 (FIG. 1) to inflate the air bag 120, but also instructs the driver 174 to drive the reel 172 to rotate, and the wire 176 is released from the reel 172, such that the air bag 120 of the present embodiment is inflated from the fully folded state (not shown) to the inflated state as shown in FIG. 4.

In the present embodiment, when the air-conditioning system of the vehicle body 15 stops operating, the controller 132 instructs the air pump 110 to stop supplying air to the air bag 120. In this embodiment, the pipeline 150 may also be provided with a gate (not shown). For example, when the air conditioner in the vehicle body 15 stops operating, the gate of the pipeline 150 is opened to allow air in the air bag to flow out. Alternatively, the edge of the air bag 120 close to the air vent 122 may not be completely sealed to the pipeline 150 to allow air to pass through. Yet alternatively, when the air pump 110 stops supplying air to the air bag 120, the air in the air bag can flow reversely to leak from the air pump 110. In this manner, if the air bag 120 that is inflated and expanded is no longer supplied with air, the air in the air bag 120 can be leaked, so that the air bag 120 becomes a deflated state as shown in FIG. 5. Certainly, the way the air bag 120 is deflated is not limited thereto.

Furthermore, the controller 132 instructs the driver 174 to drive the reel 172 to rotate in a direction opposite to the direction when the wire 176 is released, and as shown in FIG. 6, the wire 176 is gradually wound around the reel 172 to collect the air bag 120. Therefore, in the present embodiment, the air pump 110a may not have the function of sucking back the air bag 120 as long as the air bag 120 can be deflated so that the air bag 120 can be smoothly pulled back by the wire 176 (FIG. 6). The disclosure is not limited thereto.

In addition, it should be noted that, in an embodiment, a special design may be made between a portion of the air bag 120 next to the air vent 122 and the pipeline 150. For example, the design may be that the portion next to the air vent 122 is not sealed to the pipeline 150 but can be attached to the wall surface of the pipeline 150 when not being subjected to an external force, such that the inflated and expanded air bag 120 can maintain at a specific volume within a specific time period without being deflated as long as it is not subjected to the external force. When the air bag 120 is squeezed by an external force, the air in the air bag 120 can be squeezed out and the air bag 120 is deflated. Therefore, when the air bag 120 is subjected to the pulling force of the wire 176, the portion of the air bag 120 next to the air vent 122 is deformed and a gap between the portion and the pipeline 150 is exposed, such that the air bag 120 is deflated. In this manner, when the air-conditioning system of the vehicle body 15 is stopped, as long as the air pump 110 stops inflating the air bag 120 and cooperates with the pulling force provided by the driver 174, the air bag 120 can be slowly deflated and retracted by the wire 176. Of course, the present disclosure provides no limitation to the form and fixing method of the air bag 120.

In summary, the air conditioner energy-saving inflatable device of the present disclosure has an air bag communicated with the air pump, and has a controller electrically connected to the sensor and the air pump. When the air-conditioning system in the vehicle is activated, if the sensor senses that there is vacancy in the vehicle body, the controller can instruct the air pump to inflate the air bag, so that the air bag is expanded and occupies a partial space of the vacancy, such that the space for air-conditioning circulation in the vehicle is reduced, thereby saving air-conditioning energy consumption. In addition, when the air-conditioning system in the vehicle is in a non-operating state, the air bag is deflated and restored to the state where the space is not occupied. In addition, the air conditioner energy-saving inflatable device of the present disclosure also has the bag-collecting function, and can utilize the air pump to suck the air bag back into the pipeline, or utilize the wire to pull the air bag back, so that the air bag is collected at the entrance of the pipeline, and thus the air bag is restored to the state where it does not occupy space.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. An air conditioner energy-saving inflatable device adapted to be disposed in a vehicle body, comprising:
    an air pump;
    an air bag communicated with the air pump and adapted to be disposed beside an area in the vehicle body;
    a circuit board electrically connected to the air pump and comprising a controller; and
    a sensor electrically connected to the circuit board and adapted to be disposed in the area of the vehicle body,
    wherein when an air-conditioning system of the vehicle body is activated, the sensor is adapted to sense whether the area of the vehicle body is vacant,
    when the sensor senses that the area in the vehicle body is vacant, the controller instructs the air pump to inflate the air bag and fill at least a portion of the area,
    when the air-conditioning system of the vehicle body stops operating, the air bag is deflated.

2. The air conditioner energy-saving inflatable device according to claim 1, further comprising:
    a pipeline disposed between the air pump and the air bag to communicate the air pump with the air bag, wherein the air bag has an air vent, and an edge of the air bag close to the air vent is fixed on an inner wall of the pipeline, when the air-conditioning system of the vehicle body is stopped, the air pump sucks air from the air bag to deflate the air bag, and the deflated air bag is sucked into the pipeline by the air pump.

3. The air conditioner energy-saving inflatable device according to claim 2, further comprising:
    a mesh sheet disposed at a portion in the pipeline close to the air bag to block the air bag sucked into the pipeline by the air pump.

4. The air conditioner energy-saving inflatable device according to claim 1, further comprising:
    a bag collecting module, comprising:
        a reel;
        a driver electrically connected to the circuit board and driving the reel to rotate; and
        a wire having a first end and a second end opposite to each other, wherein the first end of the wire is connected to the air bag, the second end of the wire is connected to the reel, and the wire is retractably wound around the reel, wherein the controller is adapted to instruct the driver to drive the reel to rotate, such that the wire is released from the reel or the wire is wound around the reel to release or collect the air bag.

5. The air conditioner energy-saving inflatable device according to claim 1, wherein the sensor comprises an infrared sensor, a Doppler radar, a millimeter wave radar, or a combination thereof.

6. A vehicle, comprising:
    a vehicle body; and
    an air conditioner energy-saving inflatable device disposed in the vehicle body, and the air conditioner energy-saving inflatable device comprising:
        an air pump;
        an air bag communicated with the air pump and adapted to be disposed beside an area in the vehicle body;
        a circuit board electrically connected to the air pump and comprising a controller; and
        a sensor electrically connected to the circuit board and adapted to be disposed in the area of the vehicle body,
        wherein when an air-conditioning system of the vehicle body is activated, the sensor is adapted to sense whether the area of the vehicle body is vacant,
        when the sensor senses that the area in the vehicle body is vacant, the controller instructs the air pump to inflate the air bag and fill at least a portion of the area,
        when the air-conditioning system of the vehicle body stops operating, the air bag is deflated.

7. The vehicle according to claim 6, further comprising:
    a pipeline disposed between the air pump and the air bag to communicate the air pump with the air bag, wherein the air bag has an air vent, and an edge of the air bag close to the air vent is fixed on an inner wall of the pipeline, when the air-conditioning system of the vehicle body is stopped, the air pump sucks air from the air bag to deflate the air bag, and the deflated air bag is sucked into the pipeline by the air pump.

8. The vehicle according to claim 7, further comprising:
    a mesh sheet disposed at a portion in the pipeline close to the air bag to block the air bag sucked into the pipeline by the air pump.

9. The vehicle according to claim 6, further comprising:
    a bag collecting module, comprising:
        a reel;
        a driver electrically connected to the circuit board and driving the reel to rotate; and
        a wire having a first end and a second end opposite to each other, wherein the first end of the wire is connected to the air bag, the second end of the wire is connected to the reel, and the wire is retractably wound around the reel, wherein the controller is adapted to instruct the driver to drive the reel to rotate, such that the wire is released from the reel or the wire is wound around the reel to release or collect the air bag.

10. The vehicle according to claim 6, wherein the sensor comprises an infrared sensor, a Doppler radar, a millimeter wave radar, or a combination thereof.

* * * * *